United States Patent [19]
Stefanescu et al.

[11] 3,755,199
[45] Aug. 28, 1973

[54] UNREDUCED CATALYST FOR AMMONIA SYNTHESIS AND PROCESS FOR ITS MANUFACTURE

[75] Inventors: Constantin Stefanescu; Ion Vartolomei; Gheorghe Urziceanu; Gheorghe Badea, all of Craiova, Romania

[73] Assignee: Combinatul Chimic Craiova, Craiova, Romania

[22] Filed: Aug. 18, 1971

[21] Appl. No.: 172,895

Related U.S. Application Data

[63] Continuation-in-part of Ser. No. 806,737, March 12, 1969, abandoned.

[52] U.S. Cl. ......... 252/455 R, 252/459, 252/466 J, 252/473, 252/474
[51] Int. Cl. ..................... B01j 11/40, B01j 11/22
[58] Field of Search ............ 252/472, 455 R, 466 J, 252/459, 473, 474

[56] References Cited
UNITED STATES PATENTS 3,417,031  12/1968  Hinrichs et al. ................. 252/472
3,644,216  2/1972  Egalon et al. .................. 252/455 R Primary Examiner—C. F. Dees
Attorney—Karl F. Ross

[57] ABSTRACT

A catalyst for ammonia synthesis having a high catalytic activity and good physical-chemical characteristics is prepared by gradually melting an iron bar above a steel crucible cooled on the outside with water. The melting is carried out uninterruptedly over a period of 16 minutes by directing onto the melting end of the bar an oxygen stream, e.g. at a pressure of 0.15 atm. An oxidizing melting reaction of the iron occurs which being exothermal has the effect of raising the temperature. The ferrous oxide flows into the crucible and concomitantly are added the promoters, i.e. $Al_2O_3$, $K_2CO_3$, $SiO_2$, CaO. An inhomogeneous fluid mass results. The crucible is then closed and oxygen is fed in, producing inside the crucible (over a period of 3 minutes) a pressure of 2 kg/sq cm. Feeding of oxygen is then stopped and the crucible is immediately discharged. The molten mass is cooled, crushed, sized and packed.

5 Claims, No Drawings

UNREDUCED CATALYST FOR AMMONIA SYNTHESIS AND PROCESS FOR ITS MANUFACTURE

CROSS REFERENCE TO RELATED APPLICATION

This is a continuation-in-part of our copending application Ser. No. 806,737, filed on Mar. 12, 1969 (now abandoned), replaced by application Ser. No. 86,311 of Nov. 2, 1970, also abandoned.

FIELD OF THE INVENTION

The present invention relates to an unreduced catalyst for ammonia synthesis and to a process for its manufacture.

BACKGROUND OF THE INVENTION

Many catalysts, and processes for making same, are known for ammonia synthesis. Each of the hitherto-known types of catalyst has one or another of the following disadvantages: hygroscopicity, poor mechanical resistance, long reduction times, partial or total loss of catalyst activity at high operating temperatures, low efficiency and poor productivity. Basically, the prior-art processes for manufacturing the ammonia-synthesis catalysts make use of oxidizing melting of special iron to magnetite with addition of promoters, and melting of natural or synthetic magnetite together with promoters in electrical furnaces with or without introduction of steam.

The drawbacks of these methods and of their several variants reside in that they cannot produce a perfectly homogeneous mixture of the magnetite and the respective promoters; the result is a detrimental influence on the physico-chemical characteristics and on the catalytic activity of the catalysts.

OBJECT OF THE INVENTION

It is an object of this invention to provide an improved nonreduced catalyst, and method of making same, for ammonia synthesis.

SUMMARY OF THE INVENTION

The present invention eliminates the above-mentioned drawbacks in that the oxidizing melting of iron is carried out stepwise, in a first step only to ferrous oxide, concomitantly with the introduction of the promoters; in the second step a rapid oxidation of the molten ferrous oxide is carried out under pressure in an oxygen medium, which effects an intensive ebullition or bubbling of the fluidized mass under the influence of the heat evolved from the oxidation reaction nd promotes simultaneously secondary chemical reaction between the iron oxides and the promoters.

According to another feature of the invention, the promoters are the following: 3.3 percent by weight of the iron body to 4.2% $Al_2O_3$ (1.2–1.5 kg per 36 kg iron), 1.4 to 2.25% $K_2CO_3$ (0.5–0.8 kg), 0 to 1.4% $SiO_2$ (0–0.5 kg), and 0 to 6.66% $CaO$ (0–2.4 kg). Advantageously the lower limit for both the silicon dioxide and lime is 0.35 percent, always by weight.

The process, according to the invention, uses 0.15 kgf/sq cm oxygen for the mild oxidizing melting of iron to ferrous oxide, at a temperature between 1,530° and 1,727° Centigrade, according to the principal reaction:

$$Fe + \tfrac{1}{2} O_2 = FeO + 64.4 \text{ kcal.}$$

The mild oxidizing melting is carried out, in known apparatus, uninterruptedly over a period of 16 minutes, until the entire body of iron intended for the respective charge is consumed, concomitant with the introduction in small portions of the promoters, which may be two to four in number, using dosage recipes known per se.

The next step of the process is carried out in the case of a 36 kg iron body, according to the invention, over a period of 3 minutes at a pressure of 2 kgf/sq. cm., the molten ferrous oxide being oxidized quickly and violently in an oxygen atmosphere, according to the principal reaction:

$$3 FeO + \tfrac{1}{2} O_2 = Fe_3O_4 + 72 \text{ kcal.}$$

Owing to the reaction heat, a temperature of between 1,369°C and 2,000°C is developed, which fluidizes the molten mass, in an excessive agitation stae and promotes homogenization, as well as secondary reactions between the iron oxides and the metal oxides introduced as promoters in the first step.

SPECIFIC EXAMPLES

The preparation of a tetrapromoter catalyst for ammonia synthesis is illustrated by the following examples:

EXAMPLE I:

The end of an iron bar is heated by means of an autogenous-welding burner up to 1,500°C. At this temperature, the mild oxidizing melting of the iron is started by directing a 0.15 kgf/sq cm oxygen current onto the melting end of the bar, the temperature rising to 1,727°C by virtue of the exothermal reaction. The ferrous oxide in the molten state flows into a steel crucible, cooled on the outside by water, where, owing to the heat exchange, it begins to cool. For one charge, 36 kg of iron are uninterruptedly melted during a period of 16 minutes, concomitantly with the progressive introduction into the melt of the following amounts of promoters: $Al_2O_3$ 1.5 kg; $Co_3K_2$ 0.8 kg; $SiO_2$ 0.5 kg and $CaO$ 2.4 kg. A semi-fluid nonhomogeneous mass results. The crucible is closed and oxygen is fed in, raising the pressure within the crucible from 0.15 kg/cm² to 2 kg/sq cm pressure during a period of 3 minutes. Feeding of oxygen is then stopped and the crucible is immediately tipped over. The molten mass cools down, is crushed, sorted and packed.

The results given below are of experiments made in a commercial plant, provided with a UHDE type synthesis column, wherein the catalyst made as described above is placed in tubes, the gas having five paths; in this plant it was not possible to obtain fully optimum conditions because the gas rate of flow of the compressors was insufficient owing to the high activity of the catalyst tested.

Ammonia synthesis achieved with the catalyst prepared according to the invention:

(a) Heating Period

| Time | Pressure | Maximum Temperature |
|---|---|---|
| hours | atmospheres | °C |
| 24 | 90 – 100 | 260 – 420 |

(b) Reduction Period

| Time | Pressure at which the reduction was accomplished | Temperature at beginning of reduction | Temperature at the end of reduction |
|---|---|---|---|
| hours | atmospheres | t°C | t°C |
| 20 | 250 – 270 | 260 – 420 | 460 – 560 |

| Symbol | Unit of measure | Value |
|---|---|---|
| Rate of flow of fresh gas | m³/h(S.T.P.) | 2,700 |
| Rate of flow of | | |

| | | |
|---|---|---|
| recycled gas m³/h(S.T.P.) | | 5,000 |
| Catalyst amount | cubic meters | 0.216 |
| Operating temperature | °C | 560 |
| Operating pressure | atmosphere | 240 – 250 |
| Ammonia percentage at inlet of the column | % 100 | 2.68 |
| Ammonia percentage at outlet of the column | % 100 | 12.88 |
| Efficiency (% NH₃/V eg.) · 100 | | 69% |
| Mean ammonia production/day tons | | 14.5 |
| Productivity (tons NH₃/m³ catal.)/24 h | | 67 |

EXAMPLE II

The process of Example I was carried out, but neither $SiO_2$ nor CaO were employed. The results were substantially the same.

EXAMPLE III

Once again the process was identical to that given above except that the following quantities of the four promoters were used:

1.2 kg $Al_2O_3$, 0.5 kg $K_2CO_3$, 0.3 kg $SiO_2$, and 1 kg CaO. The results also were substantially equivalent with those given above.

The catalyst, according to this invention, presents the advantage that it is not hydroscopic and does not need to be packed hermetically, it is resistant to compression (85 kgf/granule), and it has a high thermal stability.

We claim:

1. A method of making an unreduced catalyst for the synthesis of ammonia in a reduced state, comprising the steps of:

continuously melting an iron body in the presence of only sufficient oxygen to form ferrous oxide from the melt by melting an iron bar continuously and uninterruptedly by directing against the melting bar a stream of oxygen and concomitantly mixing the ferrous-oxide melt with 3.3 percent by weight to 4.2% $Al_2O_3$, 1.4% to 2.25% $K_2CO_3$, 0% to 1.4% $SiO_2$ and 0% to 6.66% CaO, and thereafter rapidly oxidizing the mixture under an oxygen pressure to convert the ferrous oxide at least in part to ferric oxide while inducing ebullition of the mixture.

2. The method defined in claim 1 wherein said stream of oxygen has a pressure of about 0.15 kgf/cm².

3. The method defined in claim 2 wherein the molten ferrous oxide is oxidized in a crucible under an oxygen pressure of substantially 2 kg/cm².

4. The method defined in claim 3 wherein said body is melted at a temperature of substantially 1,727° Centigrade and said mixture is oxidized at a temperature of at least 1,369° Centigrade.

5. A method of making an unreduced catalyst for the synthesis of ammonia in a reduced state, comprising the steps of:

continuously melting at a temperature up to about 1,727°C an iron body in the presence of only sufficient oxygen at a pressure of about 0.15 kg/cm² to form ferrous oxide from the melt and concomitantly mixing the ferrous-oxide melt with at least two ammonia-synthesis-catalyst promoters selected from the group consisting of $Al_2O_3$, $K_2CO_3$, $SiO_2$ and CaO; and thereafter rapidly oxidizing the mixture under an oxygen pressure of substantially 2 kg/cm² and at a temperature of at least about 1,369°C to convert the ferrous oxide at least in part to ferric oxide while inducing ebullition of the mixture, all four of the members of said group being added during the oxidizing melting of said iron bar in the proportion of 1.5 kg $Al_2O_3$, 0.8 kg $K_2CO_3$, 0.5 kg $SiO_2$ and 2.4 kg CaO per 36 kg of the iron bar.

* * * * *